April 15, 1969 K. WANKE 3,439,202

COOLING SYSTEM FOR ELECTRICAL GENERATORS

Filed April 6, 1967

Inventor:
Karl Wanke
BY *Spencer & Kaye*
Attorneys

United States Patent Office 3,439,202
Patented Apr. 15, 1969

3,439,202
COOLING SYSTEM FOR ELECTRICAL
GENERATORS
Karl Wanke, Mulheim (Ruhr), Germany, assignor to
Licentia Patent-Verwaltungs G.m.b.H., Frankfurt
am Main, Germany
Filed Apr. 6, 1967, Ser. No. 629,023
Claims priority, application Germany, Apr. 7, 1966,
L 53,298
Int. Cl. H02k 9/00, 1/32, 3/24
U.S. Cl. 310—52                                          6 Claims

ABSTRACT OF THE DISCLOSURE

A plurality of non-conducting rings are provided encircling the rotor of an electrical generator in the air gap between the rotor and stator thereof to divide the air gap into a plurality of axially spaced coolant sectors for a gas cooling system. The rings are, e.g., formed by winding a strip of plastic impregnated fiber glass gauze around the rotor to form a multi-layer ring of non-conductive material. The fiber glass gauze can be placed under tension during the winding operation to prestress the individual layers of the ring along their circumferential dimension.

BACKGROUND OF THE INVENTION

This invention relates to rotary electrical machines, particularly to turbogenerators, which have an air gap between the rotor and stator thereof, a gas coolant system for circulating a cooling gas in the air gap, and at least one ring encircling the rotor within the air gap.

The known turbogenerators of this type use a plurality of such rings to subdivide the air gap into axially sequential sectors, thus defining coolant zones or paths, respectively, within the rotor and/or stator. In the past, the rings have been made of metal which, due to its electrical conductivity, is heated by the effect of the alternating magnetic field of the stator. This heating reduces the life of the rings and introduces eddy current losses which reduce the efficiency of the generator. Furthermore, the coolant, which is already heated, is additionally heated within the air gap by the heat generated in the rings, thereby reducing the effectiveness of the cooling system.

SUMMARY OF THE INVENTION

The principal object of this invention is to provide an improved ring structure which eliminates the above-noted disadvantages. In accordance with this invention, the rotor rings in the above-noted type of electrical machine are made of a material which is electrically non-conductive. No current can be induced in such a ring, and therefore no eddy current losses can occur. Moreover, since the ring is not heated, it does not heat the coolant, thereby increasing the efficiency of the cooling system in addition to increasing the efficiency of the electrical machine.

The ring of this invention preferably comprises a strip of non-conductive material which is wound around the rotor to form a multi-layer ring. This type of ring is particularly easy to manufacture. The strip of material from which the ring is wound preferably comprises a strip of fiber glass gauze which is impregnated with a plastic resin.

DESCRIPTION OF THE PREFERRED EMBODIMENT

Figure 1:
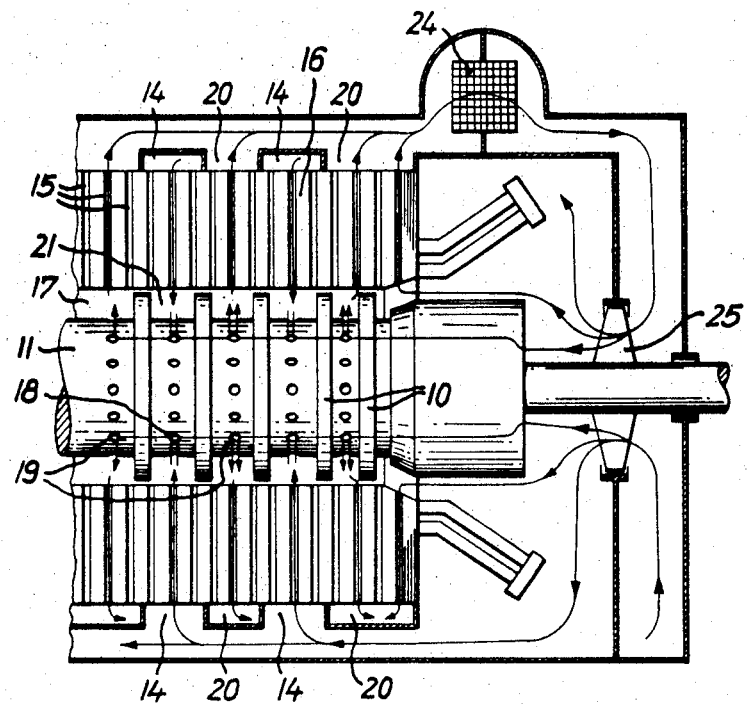
FIGURE 1 is a vertical cross-sectional view of a turbogenerator utilizing one illustrative embodiment of the invention.

FIGURE 1 shows a turbogenerator containing a rotor 11 which is spaced from a stator core 16 by an air gap 17. A plurality of rings 10 encircle the rotor 11 within air gap 17 at spaced intervals along the rotor. Each ring 10 is formed by a strip wound around the rotor 11, the strip preferably comprising a fiber glass gauze which is impregnated with a plastic resin, e.g., epoxy resin. The layers 12 of the strip wound around rotor 11 (see FIGURE 2) adhere to each other, the adhesive being the synthetic resin with which the strip is impregnated. A special adhesive, however, can also be applied between the layers, or the surface of the strip can be coated with a special adhesive. Both types of adhesives can be applied in combination if desired, and the adhesive can be either coldsetting or thermosetting.

The layers 12 of each individual ring 10 are wound around the rotor 11 or on top of each other, respectively, under continuous tension. This tension, which is applied in the circumferential or tangential direction, respectively, results in a prestressed tension of the individual layers, and thus of the ring, in its circumferential dimension. Under influence of centrifugal force, the ring 10 thus remains positively seated on the rotor due to the prestressing tension. It is also practical in this connection to heat the ring 10 subsequent to winding and glueing and then to cool it, i.e., to harden it. The hardening temperature, of course, depends on the resin used.

Figure 2:
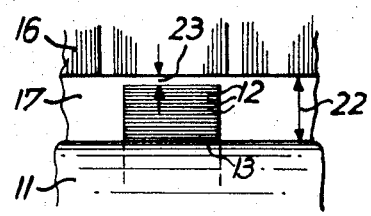
FIGURE 2 is an enlarged vertical cross-sectional view of one of the rotor rings shown in FIGURE 1.

Coolant paths are formed in the generator by gas chambers 14 in the housing thereof, radial slits 15 in the stator core 16, the air gap 17, channels in the rotor 11 with input openings 18 and output openings 19, and by hot gas chambers 20. The flow path followed by the coolant gas through these openings is indicated by the arrows in FIGURE 1. The coolant gas absorbs heat from the stator core 16, from the stator windings, and from the inductor windings. The streams of cool gas and hot gas are separated from each other within the air gap 17 by the rings 10. The air gap 17 is divided by the rings 10 into axially spaced air gap chambers 21, which have very little fluid communication with each other. As can be seen in FIGURE 2, each ring 10 takes up all but ⅕ of the radial width 22 of the air gap. The coolant gas preferably comprises hydrogen, and it is driven through the coolant paths by a fan 25. The heated coolant gas is cooled by a ventilator 24.

The cooling effect of the above-described multi-sectional cooling system is very intensive and independent of the length of the rotor. This multi-sectional cooling system is particularly remarkable because of its uniform absorption of heat along the length of the rotor and stator structures with low heating peaks and it is particularly suited for gas-cooled electrical machines having a limited output. The rings 10 are of significant importance for the fault-free operation of such a cooling system. The radial slits 23 are relatively small in relation to the width of the air gap 22. Since the rings 10 are made of non-conductive material, they will not be heated by the stator field so that they, in turn, will not increase the temperature of the coolant in the air gap 17.

The above-described multi-sectional cooling system, as well as the details of the ring structure thereof, can be used with the same advantage in any type of rotary electrical machine, and is by no means restricted to turbogenerators.

It will be understood that the above description of the present invention is susceptible to various modifications, changes, and adaptations, and the same are intended to be comprehended within the meaning and range of equivalents of the appended claims.

I claim:
1. In an electrical machine containing a rotor which is separated from a stator by an air gap, and a gas coolant system for circulating a cooling gas through said air gap, the improvement comprising at least one ring of non-conductive material encircling said rotor within said air gap.

2. The improvement defined in claim 1 wherein said ring of non-conductive material comprises a strip of non-conductive material wound around said rotor to form a multi-layer ring of non-conductive material.

3. The improvement defined in claim 2 wherein said strip of non-conductive material comprises fiber glass gauze saturated with a plastic resin.

4. The improvement defined in claim 2 wherein adjacent layers of said multi-layer ring adhere to each other.

5. The improvement defined in claim 2 wherein the inner layer of said multi-layer ring adheres to the adjacent surface of said rotor.

6. The improvement defined in claim 2 wherein the layers of said multi-layer ring are under prestressed tension in the circumferential dimension thereof.

References Cited
UNITED STATES PATENTS

| | | | |
|---|---|---|---|
| 2,176,871 | 10/1939 | Harrell et al. | 310—64 |
| 3,056,055 | 9/1962 | Willyoung et al. | 310—64 |
| 3,110,827 | 11/1963 | Baudry | 310—61 |
| 3,271,600 | 9/1966 | Philofsky | 310—55 |
| 3,348,081 | 10/1967 | Willyoung | 310—55 |

WARREN E. RAY, *Primary Examiner.*

R. SKUDY, *Assistant Examiner.*

U.S. Cl. X.R.

310—55, 58, 61, 64